(12) United States Patent
Boer et al.

(10) Patent No.: US 8,615,033 B2
(45) Date of Patent: Dec. 24, 2013

(54) DATA TRANSMISSION RATE ADAPTATION IN A WIRELESS COMMUNICATION SYSTEM

(75) Inventors: Jan Boer, Odijk (NL); Bas Driesen, Dongen (NL); Ra'anan Gil, Nieuwegein (NL); Kai Roland Kriedte, Woerden (NL)

(73) Assignee: Agere Systems LLC, Allentown, PA (US)

( * ) Notice: Subject to any disclaimer, the term of this patent is extended or adjusted under 35 U.S.C. 154(b) by 1114 days.

(21) Appl. No.: 12/346,476

(22) Filed: Dec. 30, 2008

(65) Prior Publication Data
US 2009/0129451 A1   May 21, 2009

Related U.S. Application Data

(63) Continuation of application No. 10/305,554, filed on Nov. 27, 2002, now Pat. No. 7,499,486.

(51) Int. Cl.
*H04B 1/38* (2006.01)

(52) U.S. Cl.
USPC ........... 375/219; 375/225; 375/227; 375/264; 375/267; 375/287; 375/299; 375/315; 370/252; 370/465

(58) Field of Classification Search
CPC ... H04L 1/0003; H04L 1/0002; H04L 1/0015; H04L 1/0021; H04L 1/0017; H04L 1/20
USPC ......... 375/316, 219, 225, 227–228, 260, 267, 375/287, 299, 264, 295, 296, 315; 370/230, 370/252, 341, 342, 465
See application file for complete search history.

(56) References Cited

U.S. PATENT DOCUMENTS

| | | |
|---|---|---|
| 5,621,737 A | 4/1997 | Bucher |
| 5,828,695 A | 10/1998 | Webb |
| 6,175,550 B1 | 1/2001 | van Nee |
| 6,252,898 B1 * | 6/2001 | Eto et al. .......... 375/130 |
| 6,304,594 B1 * | 10/2001 | Salinger .......... 375/222 |
| 6,452,964 B1 * | 9/2002 | Yoshida .......... 375/222 |
| 6,529,730 B1 * | 3/2003 | Komaili et al. .......... 455/452.2 |
| 6,587,503 B1 * | 7/2003 | Takeuchi et al. .......... 375/227 |
| 6,961,388 B2 * | 11/2005 | Ling et al. .......... 375/267 |
| 7,164,649 B2 * | 1/2007 | Walton et al. .......... 370/203 |
| 7,443,827 B2 | 10/2008 | Sano |

FOREIGN PATENT DOCUMENTS

| | | |
|---|---|---|
| EP | 1 367 752 A1 | 12/2003 |
| EP | 03 25 4210 | 11/2004 |

(Continued)

OTHER PUBLICATIONS

IEEE Std. 802.11a-1999, "Part 11: Wireless LAN Medium Access Control", Sep. 1999.*

(Continued)

*Primary Examiner* — Sophia Vlahos
(74) *Attorney, Agent, or Firm* — Ryan, Mason & Lewis, LLP

(57) ABSTRACT

A method for controlling a transmission rate of at least one transceiver, the transceiver including a transmitter and a receiver, includes: determining a signal quality characteristic corresponding to a signal received at the receiver by measuring a difference between one or more reference constellation points and one or more received constellation points, and modifying a transmission rate of the transmitter over a wireless communication channel as a function of the signal quality characteristic. The step of modifying the transmission rate over the wireless communication channel includes: determining lower and upper threshold levels representing reference minimum and maximum signal quality characteristics, respectively, corresponding to the transmission rate; maintaining the transmission rate when the measured signal quality characteristic is between the lower and upper threshold levels; and increasing the transmission rate when the signal quality characteristic is less than one or more lower threshold levels associated with one or more corresponding higher transmission rates.

19 Claims, 5 Drawing Sheets

(56) References Cited

FOREIGN PATENT DOCUMENTS

| | | |
|---|---|---|
| JP | 61-270928 | 12/1986 |
| JP | 11-355373 | 12/1999 |
| JP | 2002-199033 | 7/2002 |
| WO | WO 02/067478 A1 | 8/2002 |

OTHER PUBLICATIONS

Ue et al. "Symbol Rate and Modulation Level-Controlled Adaptive Modulation/TDMA/TDD System for High-Bit-Rate Wireless Data Transmission," Nov. 1998, IEEE Transactions on Vehicular Technology, pp. 1134-1147.*

* cited by examiner

DATA TRANSMISSION RATE ADAPTATION IN A WIRELESS COMMUNICATION SYSTEM

CROSS-REFERENCE TO RELATED APPLICATION(S)

This application is a continuation of U.S. application Ser. No. 10/305,554 filed on Nov. 27, 2002, the disclosure of which is incorporated herein by reference.

FIELD OF THE INVENTION

The present invention relates generally to communication systems, and more particularly relates to controlling a data transmission rate in a wireless communication system.

BACKGROUND OF THE INVENTION

In a conventional wireless communication system including a pair of transceivers communicating with one another over a wireless communication channel, there are typically a number of different data transmission rates available at which to transmit data. Generally, the higher the data rate, the more susceptible the system is to errors. Under certain circumstances, it is necessary to adapt the system to higher or lower data transmission rates, depending on environmental conditions. For example, noise on the communication channel, transceiver impairments, etc., may necessitate operation of the system at a lower data transmission rate.

The Institute of Electrical and Electronics Engineers (IEEE) 802.11 standard addresses medium access control over a wireless local area network (WLAN). The IEEE 802.11 standard is set forth in the document IEEE Std. 802.11, entitled *Supplement to IEEE Standard for Information Technology—Telecommunications and Information Exchange Between Systems—Local Metropolitan Area Networks—Specific Requirements—Part 11: Wireless LAN Medium Access Control (MAC) and Physical Layer (PHY) Specifications*, 1999 Edition, which is incorporated herein by reference. Additional extensions relating to the 802.11 standard, including IEEE Std. 802.11a, entitled *High Speed Physical Layer in the 5 GHz Band*, February 2000, and IEEE Std. 802.11g, entitled *Further Higher Data Rate Extension in the 2.4 GHz Band*, September 2000, are also incorporated herein by reference. Rate adaptation in a wireless communication system operating in accordance with the 802.11 standard generally takes place in the transmitter at the MAC level. Known rate adaptation techniques typically rely on information acquired through acknowledgment messages received after each correctly transmitted data packet.

An acknowledgment message indicates a correctly received packet, while an absence of an acknowledgment message is generally interpreted as an error. A determination as to whether to change the data rate in the transmitter can be made in response to the number of consecutive acknowledgments that are received. After a certain number of correctly received data packets, the transmitter typically attempts to switch to a higher data transmission rate. Similarly, after a certain number of consecutive errors, the transmitter attempts to switch to a lower data transmission rate. This conventional rate-switching methodology, which is based on received acknowledgments, has the advantage of simplicity. However, it often adapts the data transmission rate of the transmitter to a value that is either too high or too low, thus undesirably impacting the throughput of the system. For example, switching to a lower data rate when, in fact, a higher rate can be supported by the system results in a significant throughput degradation. The same is true when switching to a higher data rate than the system can support, thus resulting in a high packet error rate (PER), bit error rate (BER), or frame error rate (FER).

There is a need, therefore, for an improved rate-switching technique for controlling the data transmission rate in a wireless communication system, which address the above-mentioned problems exhibited in conventional wireless communication systems.

SUMMARY OF THE INVENTION

The present invention provides techniques for advantageously adapting a data transmission rate of a wireless communication system to varying conditions in the system. Such varying conditions may include, for instance, impairments in a wireless communication channel associated with the system, impairments in a transceiver communicating over the wireless communication channel, etc. According to the invention, a decision regarding whether or not to change the data transmission rate of the wireless system is based, at least in part, on an estimation of signal degradation through the wireless communication channel.

In accordance with one aspect of the invention, a method is provided for controlling a data transmission rate of at least one transceiver in a wireless system, the transceiver including a transmitter and a receiver. The method includes the steps of: determining a signal quality characteristic corresponding to a signal received at the receiver by measuring a difference between one or more reference constellation points and one or more received constellation points, the signal quality characteristic representing an estimation of signal degradation through the wireless communication channel; and modifying a data transmission rate of the transmitter as a function of the signal quality characteristic. The step of modifying the data transmission rate of the transmitter includes: determining lower and upper threshold levels representing reference minimum and maximum signal quality characteristics, respectively, corresponding to the data transmission rate; measuring a signal quality characteristic of the received signal; determining whether the measured signal quality characteristic is within the lower and upper threshold levels; maintaining the data transmission rate when the measured signal quality characteristic is between the lower and upper threshold levels; and increasing the data transmission rate when the measured signal quality characteristic is less than one or more lower threshold levels associated with one or more corresponding higher data rates.

These and other features and advantages of the present invention will become apparent from the following detailed description of illustrative embodiments thereof, which is to be read in connection with the accompanying drawings.

DETAILED DESCRIPTION OF THE INVENTION

The present invention will be described herein in the context of an IEEE 802.11 compliant orthogonal frequency division multiplexing (OFDM) wireless communication system. It should be appreciated, however, that the present invention is not limited to this or any particular wireless communication system. Rather, the invention is more generally applicable to techniques for more optimally controlling a data transmission rate in a wireless system. Also, although particularly well-suited for use in conjunction with the IEEE 802.11 standard, the invention can be used with other standards, as well as in non-standard systems.

Figure 1:
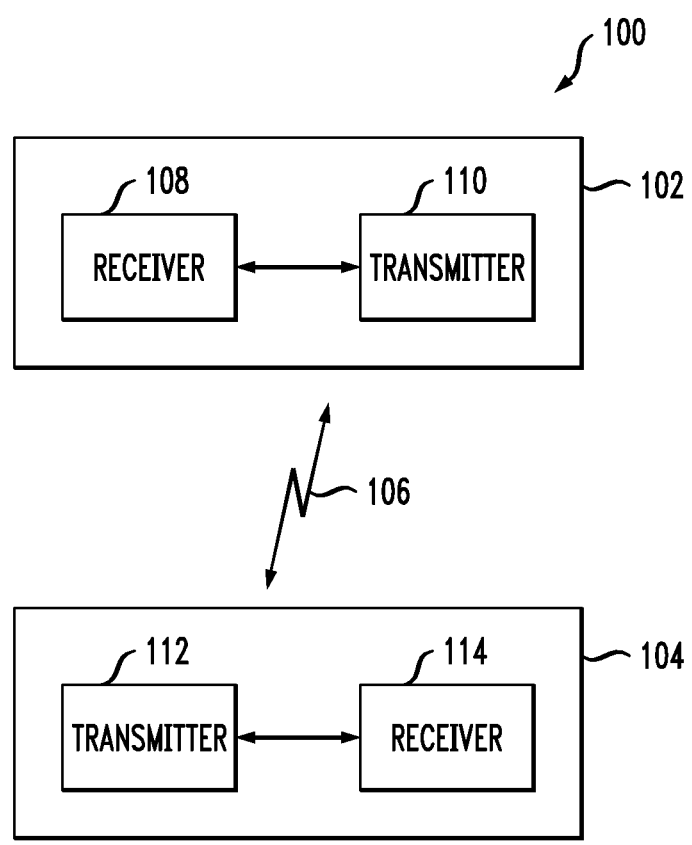
FIG. 1 is a block diagram illustrating an exemplary wireless communication system in which the techniques of the present invention may be implemented.

FIG. 1 depicts an exemplary wireless communication system 100 in which the methodologies of the present invention may be implemented. The exemplary wireless communication system 100 includes a pair of transceivers 102 and 104 communicating with one another via a communication channel 106 established between the two transceivers 102, 104. Channel 106 may be a wireless communication link, such as, but not limited to, radio frequency (RF), infrared (IR), microwave, etc., although alternative communication media may be employed. Transceiver 102 preferably comprises a receiver 108 for receiving signals from the channel 106, and a transmitter 110 for sending signals over channel 106. Similarly, transceiver 104 comprises a receiver 114 and a transmitter 112. Receivers and transmitters suitable for use with the present invention are well known by those skilled in the art. Accordingly, a detailed discussion of such receivers and transmitters will not be presented herein.

In accordance with the invention, a signal quality estimation of a received baseband signal can be useful for adapting the data transmission rate of transmissions over the wireless communication channel 106. Therefore, in accordance with one aspect of the invention, a signal degradation (SD) characteristic is preferably determined at a receiver side, exemplified by receiver 108, in a given transceiver, exemplified by transceiver 102. The SD characteristic, which represents an estimate of the signal quality through the communication channel 106, is made available to the corresponding transmitter 110 in the transceiver 102, since the transmitter typically sets the data transmission rate of transmissions over the channel 106. The receiver 108 preferably derives the SD characteristic by processing an incoming message, which can be, for example, a data frame or a control frame (e.g., an acknowledgment message). Channel impairments which may undesirably affect the ability of a signal to pass through the channel include, for example, co-channel interference, delayed signal interference, narrowband interference (e.g., from intermodulation products), thermal noise, etc. Assuming quasi-static symmetric channel transfer characteristics and transceiver impairments, acknowledgment messages undergo essentially the same signal degradation as the actual data sent and thus will be substantially the same in quality.

In multi-carrier systems, as well as single-carrier systems, each received frame generally includes a preamble and/or header portion. The preamble is used primarily for synchronization purposes, while the header is primarily used for, among other things, specifying a length and rate of the payload data. Typically, the preamble and header are modulated and encoded in a fixed manner, which may be simple and robust in comparison to the payload data in order to ease synchronization and reception of the transmitted data frame. For example, in an IEEE 802.11a/g OFDM multi-carrier system, the preamble and a SIGNAL field in the header may be modulated using binary phase shift keying (BPSK) and encoded using a binary convolutional code (BCC) rate one-half ($\frac{1}{2}$) encoder. Since the SIGNAL field is always modulated and encoded in the same manner, this information can be advantageously used to derive an SD indicator that is substantially independent of the payload data. The SD indicator may be determined, for example, by measuring a Euclidean distance (i.e., a straight line distance) between known reference constellation points and received constellation points of the SIGNAL field, in accordance with the invention. The closer the received constellation points are to the reference constellation points, the better the signal quality is, and vice versa. Other distance measures can also be used.

In the illustrative embodiment of the invention, the reliability of the SD indicator depends on at least two factors, since the use of the SIGNAL field alone may limit the precision of the signal quality estimation methodology. Therefore, in addition to use of the SIGNAL field, the signal quality estimation may also be based on, for example, an amount of variation and/or symmetry in the communication channel medium, or additional and/or alternative characteristics. A determination of the variation in the communication channel is useful in that a fast varying channel often causes the signal quality to change within a packet. Likewise, a determination of channel symmetry is useful in that an asymmetric channel tends to cause the signal quality of the transmitted packet to deviate from the received packet. A detailed description of the signal quality estimation methodology of the invention is presented below in the case of an exemplary IEEE 802.11a/g multi-carrier system. For ease of explanation, a symmetric and constant communication channel over a given packet is assumed.

As previously discussed, in conventional systems, adapting the data rate of the system primarily relies on information acquired through acknowledgment messages received in response to a transmitted data packet. The data transmission rate of the communication channel is usually changed depending on the number of good or bad transmitted/received packets. On the transmitter side, a received acknowledgment message is interpreted as a correctly received packet, while the absence of a received acknowledgment is interpreted as an error. Typically, when a predefined number of packets are received with errors, the transmission rate is switched down by one rate level. This process continues until a valid acknowledgment is received. Similarly, increasing the transmission rate typically occurs after receiving a predefined number (e.g., five) of acknowledgments. In this instance, the transmitter generally attempts to send a packet at a higher transmission rate. When an acknowledgment is received, the transmitter will change to the higher rate, while absence of an acknowledgment will result in keeping the lower rate.

Using conventional rate-switching approaches, the transmission rate is often undesirably lowered too quickly, especially in high-density areas. This may be attributed to a higher probability of collisions occurring between different stations which often cause acknowledgment messages to be missed.

As previously explained, a missed acknowledgment message is, in this case, incorrectly interpreted by the transmitter as an error, thus undesirably initiating the rate-switching procedure. Accordingly, the present invention advantageously provides an improved rate-switching methodology which allows the system to more optimally switch the transmission rate over the channel and is more reliable than conventional rate-switching approaches. Moreover, the present invention is not limited to rate-switching in single level increments, but may selectively change the rate in larger (or smaller) increments as desired.

In an exemplary IEEE 802.11a/g multi-carrier system, rate adaptation takes place inside the transmitter at a medium access control (MAC) layer. As previously stated, in accordance with an illustrative aspect of the invention, a representative SD indicator is determined, preferably at the receiver side, and is provided to the corresponding transmitter associated with a given transceiver. The SD indicator is a measure of signal quality corresponding to a received signal (e.g., a packet) and preferably estimates a condition of the communication channel at a given time. The receiver can measure the signal quality, for example, by processing an incoming message, which may include payload and/or acknowledgment data. When assuming quasi-static symmetric channel transfer characteristics and transceiver impairments, the processed message will undergo substantially the same degradation as the actual data sent, and thus the two will be substantially equal in terms of signal quality. The transmitter then bases its rate-switching decision, at least in part, on the SD indicator.

Figure 2A:
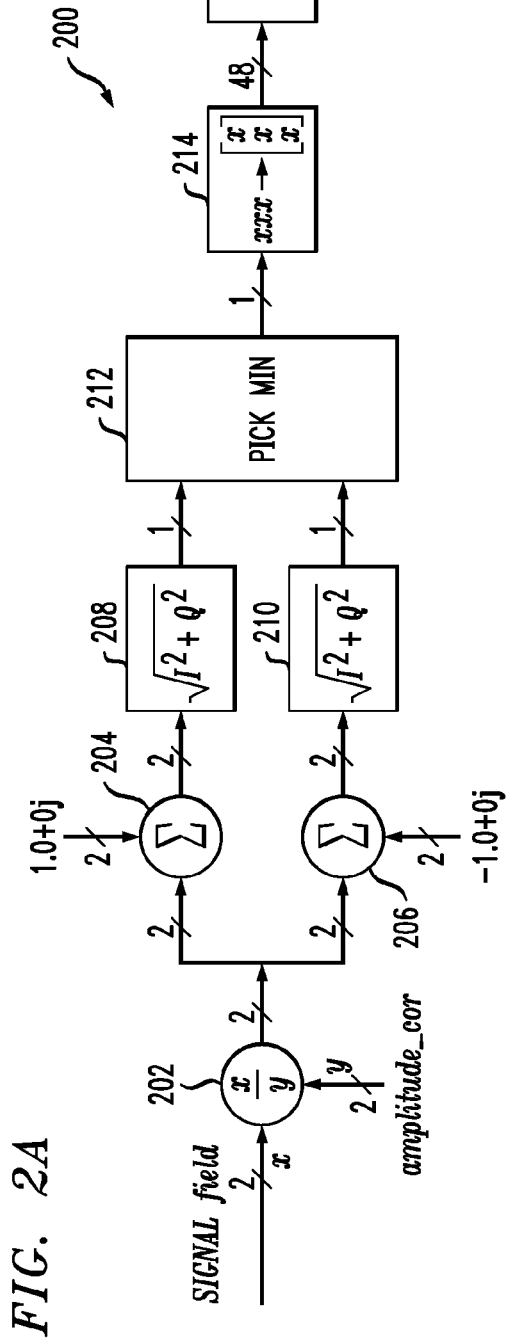
FIG. 2A is a block diagram depicting an illustrative methodology for determining a signal degradation (SD) indicator, in accordance with one aspect of the present invention.

FIG. 2A illustrates a block diagram of an exemplary circuit 200 for implementing a methodology (e.g., Signal Processing Worksystem (SPW) implementation) for computing the SD indicator, in accordance with one aspect of the invention. Circuit 200 may be implemented in the receiver of a given transceiver. Alternatively, circuit 200 may be implemented externally to the receiver, such as being incorporated into the transmitter or in a separate section of the transceiver, e.g., a controller (not shown). The SD indicator determination methodology preferably involves measuring a Euclidean distance (i.e., straight line distance) between reference constellation points and received constellation points corresponding to the modulated input signal, although alternative techniques are also contemplated by the invention. As previously stated, the closer the received signal constellation points are to the reference constellation points, the better the signal quality is, and vice versa. For rate-independent processing, and for ease of explanation, only the SIGNAL field of a message is used in the SD indicator measurement. It is to be appreciated, however, that additional and/or alternative portions of the input signal may be used for computing the signal quality estimation, in accordance with the invention. According to the above-cited 802.11a and 802.11g extensions to the 802.11 standard, the SIGNAL field includes 24 bits that are rate ½ coded and BPSK modulated, resulting in 48 samples located at phases of +1 or −1, as will be understood by those skilled in the art.

As apparent from the figure, input samples x associated with the SIGNAL field of a message are scaled by amplitude correction samples y (amplitude_cor) which represent an amplitude estimate of the channel and power droop, among other characteristics, at block 202. The scaling process in block 202 is performed, at least in part, to align the input samples x with corresponding reference samples. The scaled samples x/y are then fed to separate blocks 204 and 206 where they are compared with the reference samples at phases of +1 and −1, respectively. The comparisons performed at blocks 204 and 206 may include, for example, summing the scaled samples with respective signals (1.0+0j) and (−1.0+0j) to generate respective error samples, each of which may include in-phase (I) and quadrature-phase (Q) components.

Magnitudes of the resulting error samples corresponding to phases +1 and −1 are subsequently computed at blocks 208 and 210, respectively. The magnitudes are preferably determined by taking a square root of the squared I and Q components, as known by those skilled in the art. The two error magnitude signals are compared at block 212 to determine which signal path contains the smallest error magnitude. The output of block 212, which represents the minimum error magnitude value of the two signal paths, is then further processed. The minimum error magnitude value is then preferably stored, for example, in an array at block 214. Block 214 may include a serial-to-parallel converter, or alternative means, for storing and/or arranging the minimum error magnitude values corresponding to each of the samples in the packet. After all 48 bits of the SIGNAL field have been processed at block 214, the 48 magnitude values are then summed at block 216 and the resulting number may be used to represent the signal degradation.

Figure 2B:
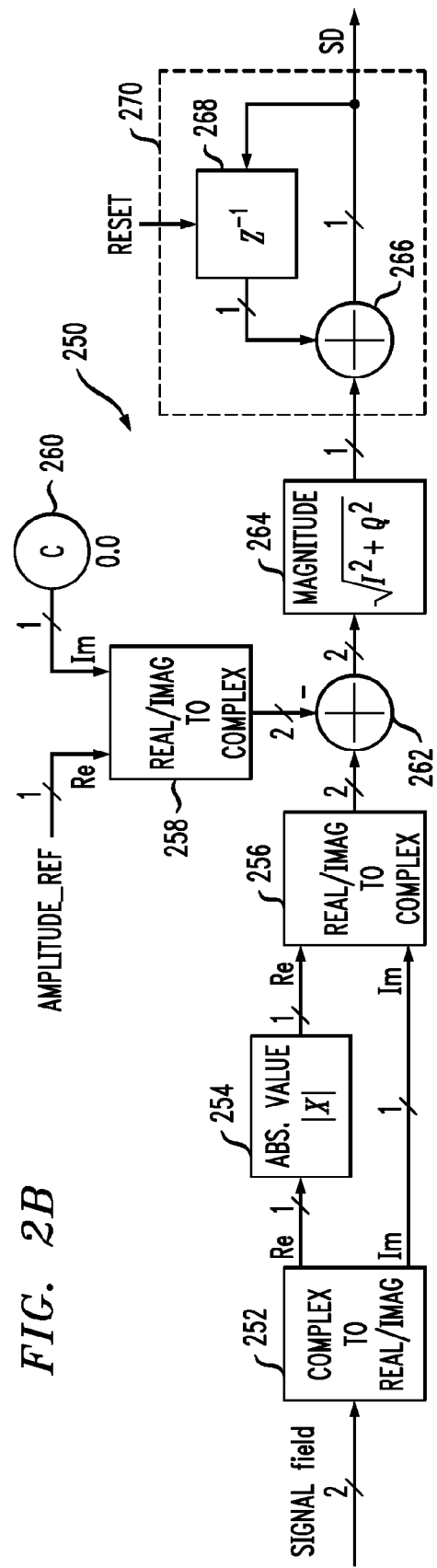
FIG. 2B is a block diagram depicting an illustrative methodology for determining an SD indicator, in accordance with another aspect of the invention.

In FIG. 2B there is shown an alternative embodiment of the SD indicator computation circuit depicted in FIG. 2A. The SD indicator circuit 250 is advantageous in that it can be more easily implemented in an integrated circuit (IC) device. As apparent from the figure, this implementation does not employ a divide operation (which is generally more difficult to implement) and has only one signal path, rather than two. A first simplification that can be performed is mapping all incoming samples to the positive half plane. This may be accomplished, for example, by converting the incoming samples of the SIGNAL field into real (Re) and imaginary (Im) components at block 252 and taking an absolute value of a real component at block 254. This simplification is justified because comparing a sample in the negative half plane with the negative (−1) reference point is the same, at least in terms of magnitude, as comparing a mirrored version of this sample with the positive (+1) reference point. The absolute value of the real component, which is also a real component, is then preferably combined with the imaginary component at block 256 to generate a complex signal. Block 256 may be implemented in accordance with a real/imaginary-to-complex converter, which may include, for example, a digital signal processor (DSP), as will be understood by those skilled in the art.

Instead of comparing the incoming samples with +1 or −1 reference samples, which require scaling in front (as in the circuit of FIG. 2A), the incoming samples in exemplary circuit 250 are compared with an amplitude reference for that specific subcarrier at block 262. The comparison at block 262 may comprise subtracting the amplitude reference from the incoming samples. The signal representing the amplitude reference may be formed by combining a real component (Re) amplitude_ref and an imaginary component (Im) 260 of the amplitude reference at block 258. Block 258 may include a real/imaginary-to-complex converter, which may be implemented in a manner consistent with block 256 previously described. Further reduction in processing complexity may be achieved, for example, when the magnitude is approximated by a first order estimation or when the power is computed instead. The result of the comparison at block 262 is an error signal comprising I and Q components. A magnitude of the error signal is preferably obtained at block 264. The magnitude of the error signal may be computed by taking a square root of the squared I and Q components of the error signal, as will be understood by those skilled in the art.

The error magnitude values corresponding to each of the samples in the SIGNAL field may be summed by an integrator 270 that is reset after each SIGNAL field. The integrator 270 may include a summation block 266 coupled to a delay block 268 which at least temporarily stores a previous magnitude value. After all 48 magnitude values corresponding to the 48 bits in the SIGNAL field have been summed by integrator 270, the resulting number may be used to represent the signal degradation.

An alternative methodology for determining the SD indicator may comprise processing the SIGNAL field samples as well as pilot samples. The pilot samples, like the SIGNAL field samples, are preferably BPSK modulated, and can therefore be processed in the same manner as the SIGNAL field samples. One advantage of this approach is that the signal degradation would be determined using more than only the 48 samples of the SIGNAL field, and therefore may result in a more accurate estimate of the signal quality of the corresponding packet. However, the pilot samples are always spaced substantially the same in frequency, at least in an illustrative 802.11 implementation. It is to be appreciated that other communication systems may use pilot samples that are spaced differently in frequency throughout various symbol packets. Consequently, assuming only pilot samples are employed, the resulting SD indicator would only estimate the signal degradation relating to those specific frequencies and may therefore be undesirably affected by frequency selective fading. Computing the SD indicator using all frequencies would not be as prone to frequency selective fading. For at least this reason, a determination of the SD indicator based on pilot samples alone may not be preferred.

By way of example only, simulation results for the illustrative SD indicator circuit 200 depicted in FIG. 2A will now be described. Although the alternative circuit 250 shown in FIG. 2B may provide somewhat different simulation values, the conclusions drawn herein may be similarly applicable to both illustrative embodiments. For obtaining the exemplary simulation results described herein, the incoming signal comprises a SIGNAL field and data samples, with pilot samples already removed.

Figure 3:
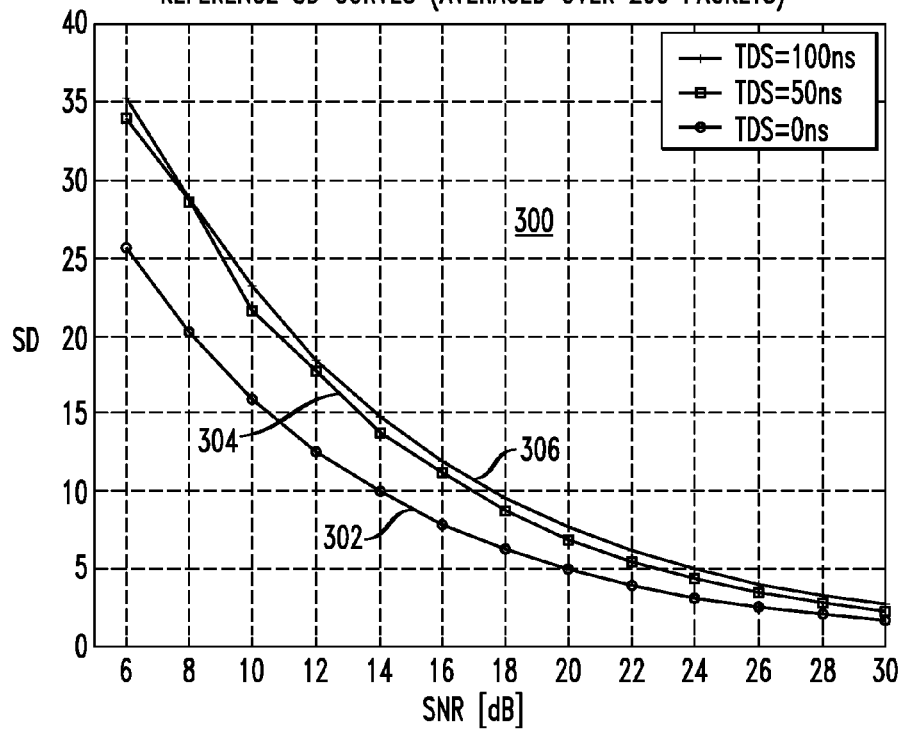
FIG. 3 is a graphical representation illustrating simulation results of reference SD curves for varying signal-to-noise ratios (SNR) and time delay spread (TDS), in accordance with the present invention.

FIG. 3 is a graphical representation 300 illustrating exemplary simulation results of reference SD curves for varying signal-to-noise ratios (SNR) and time delay spread (TDS) values in order to determine corresponding reference/mean SD value for specific SNRs and TDSs, in accordance with the invention. The exemplary simulation is carried out over 200 packets for several different SNR values (e.g., 6, 8, 10, 12, 14, 16, 18, 20, 22, 24, 26, 28 and 30 decibel (dB)) and TDS values (e.g., 0 ns, 50 ns and 100 ns). It is to be appreciated that the number of packets is arbitrary and may be chosen so as to provide an acceptable balance between sample size and simulation speed.

The SIGNAL field of each packet may be processed according to the exemplary SD indicator determination methodology shown in FIG. 2A. This will result in 200 different SD values for each different SNR value. The reference mean SD value for a given SNR may be computed by averaging these 200 SD values. FIG. 3 shows three reference SD curves 302, 304 and 306 corresponding to three different TDS values, namely, 0 ns, 50 ns and 100 ns, respectively. Each of the reference SD curves is graphed with respect to the above-noted range of SNR values. As apparent from the figure, there is about a 4 dB difference in SNR between curve 302 (0 ns TDS) and curve 306 (100 ns TDS) for an SD value of about 5. This implies that a system not suffering from TDS can handle about 4 dB more SNR than a system suffering from 100 ns TDS, both resulting in substantially the same SD. The difference in SNR between curves 302 and 306 increases slightly for lower SD values compared to higher SD values. Ideally, the SD of the SIGNAL field would perfectly match the SD of the total packet. However, this may not be the case in practice since the SIGNAL field represents just a portion of the total packet.

Figure 4:
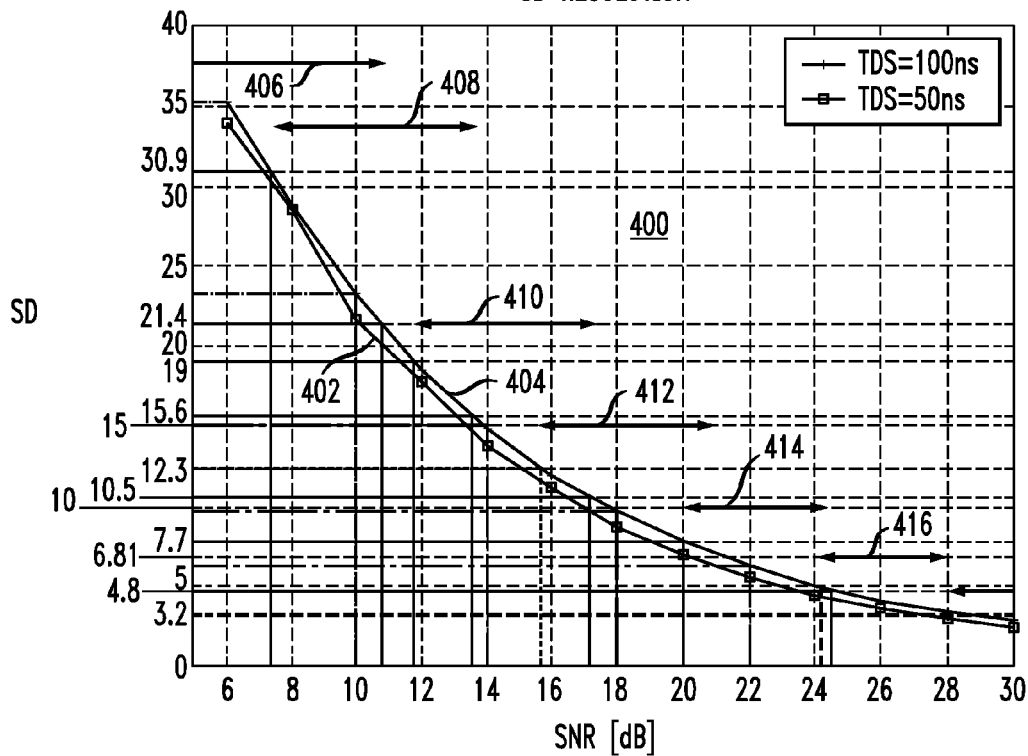
FIG. 4 is a graphical representation illustrating simulation results of SD deviation for 50 and 100 nanoseconds (ns) TDS and varying SNRs, in accordance with the present invention.

By way of example only, FIG. 4 is a graphical representation 400 illustrating simulation results of SD deviation for a TDS of 100 ns and varying SNRs, in accordance with the invention. From the simulation results, it can be seen how accurately the SIGNAL field represents the total packet. The exemplary simulation is performed over 100 60-byte BPSK-modulated packets, which gives 21 payload symbols. When each payload symbol is processed in the same manner as the SIGNAL field symbol, this results in an SD value for the total packet after averaging over all symbols. The total length of a packet in samples is determined as:

(21 payload symbols+1 SIGNAL field symbol)× 48=1056 samples

Since a static channel per packet is assumed, increasing the number of samples does not provide any significant additional information.

From the simulations, it can be shown that the distribution of the SIGNAL field SD compared to the total packet SD may be approximated by a normal distribution function. As will be understood by those skilled in the art, a property of the probability density function (PDF) of a normal distribution is that about 95 percent of its samples lie within a $\mu \pm 2\sigma$ boundary, where $\mu$ may be defined herein as the mean and $\sigma$ may be defined as the standard deviation of the distribution. The mean $\mu$ may be normalized to zero for every SNR and TDS value, but the standard deviation $\sigma$ is different. For a specific SNR and TDS value, there exists an SD reference value, and for that same SNR and TDS value, there is a standard deviation $\sigma$ between the SIGNAL field SD and the total packet SD. Since the mean $\mu$ is zero, the standard deviation may be directly mapped to the SD reference values.

With continued reference to FIG. 4, the SD reference values $\pm 2\sigma$ are shown for exemplary simulations with a TDS of 100 ns and SNR values ranging from 6 dB to 30 dB. Reference SD curves 402 and 404 for a TDS of 50 ns and 100 ns, respectively, are also shown. These curves 402, 404 are the same as reference curves 304 and 306, respectively, shown in FIG. 3. The $\pm 2\sigma$ boundaries 406, 408, 410, 412, 414 and 416 for a specific reference SD value can be correlated to the SNR axis. The resolution of the SD may be defined as a difference in SNR value between the boundaries $\pm 2\sigma$. As apparent from the figure, the different SD distribution regions may overlap, which implies that the resolution of the SD in this case is more than 4 dB SNR. Furthermore, the resolution for higher SD values is worse than the resolution for lower SD values. For instance, the SD resolution at an SD value of 6.81 is about 4 dB SNR, while the SD resolution at an SD value of about 34 is over 6 dB SNR.

Figure 5:
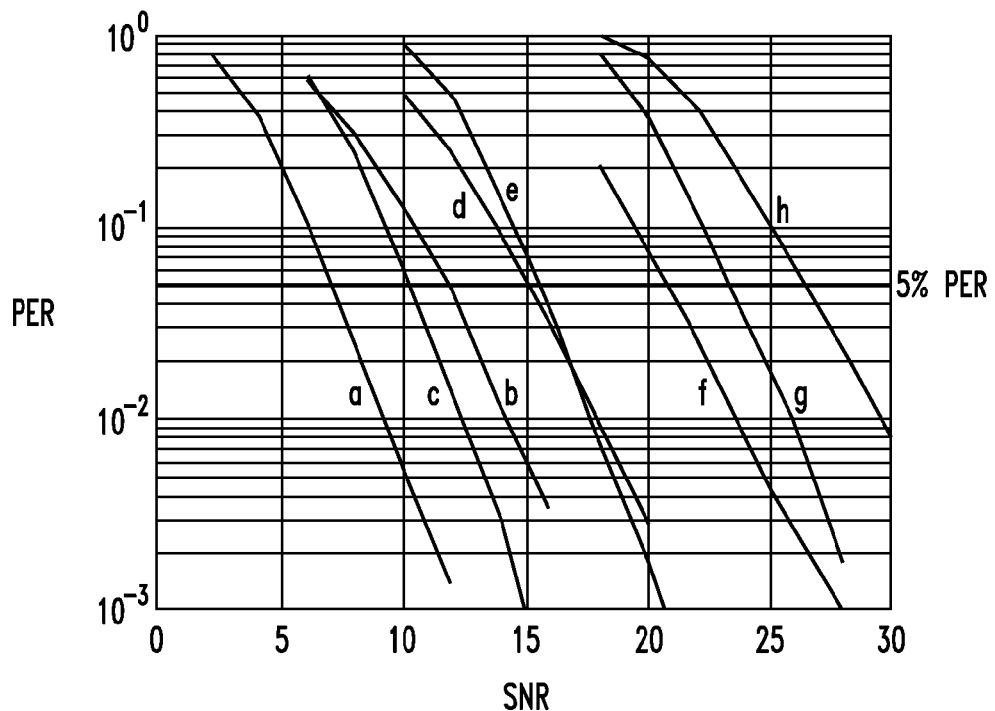
FIG. 5 is a graphical representation illustrating simulation results of system performance at different data rates, in accordance with the present invention.

Further information, upon which a data rate-switching decision may be based, can be obtained from the simulation results by correlating the SD to system performance (e.g., packet error rate (PER)) curves. FIG. 5 depicts exemplary simulated system performance curves a, b, c, d, e, f, g and h at data rates of 6, 9, 12, 18, 24, 36, 48 and 54 megabits per second (Mbps), respectively, in accordance with the invention. The exemplary simulation results were obtained for 1000 byte packets in a fading channel with a TDS of 50 ns. As apparent from the figure, for a minimum PER of 5 percent (%) at a data rate of 54 Mbps, the SNR should be greater than about 26.5 dB. As shown in FIG. 3, an SNR of 26.5 dB for a TDS of 50 ns corresponds to a reference SD value of about 3.4. This suggests that, on average, an SD value of 3.4 should result in a 5% PER for a data rate of 54 Mbps.

Assume that an SD value of 3.4 results in a 5% PER at a rate of 54 Mbps, as noted above. Based on the exemplary simulation results, this implies that a measured SD value of 3.4 or lower is sufficient to achieve at least a 5% PER for that specific data rate. However, as previously shown, the measured SD value may differ from the total packet SD, and therefore employing a predetermined safety margin is recommended.

Figure 6:
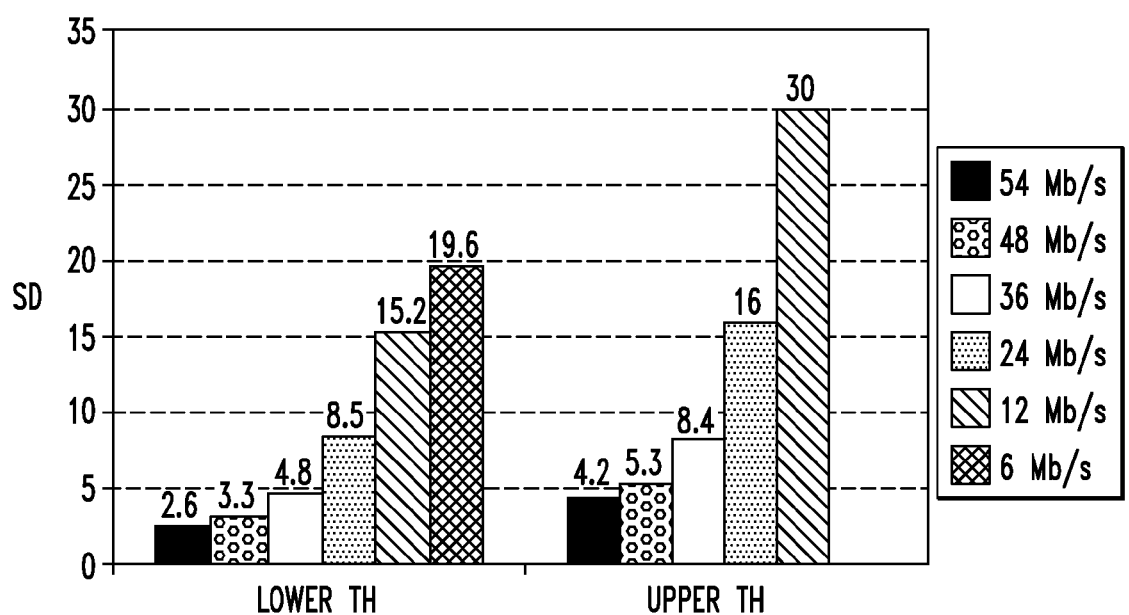
FIG. 6 is a graphical representation illustrating simulation results of lower and upper threshold SD levels, in accordance with the present invention.

In conjunction with FIG. 4, exemplary simulation results were used to measure a deviation between the SD of the SIGNAL field and the SD of the total packet, from which a resolution bandwidth can be determined. These exemplary simulations illustrate that the resolution is worse for higher TDS values. The resolution results for the SD at a TDS of 100 ns can thus be seen as a worst case scenario for the resolution of the lower TDS SD reference curves. Adding half of the resolution bandwidth to the SNR that yields a 5% PER for a specific data rate results in an SD value which may be said gives at maximum a 5% PER with a certainty of 97.5%. Subtracting half of the resolution bandwidth results in an SD value which may be said gives at minimum a 5% PER with a certainty of 97.5%. Accordingly, the two derived SD values may be seen as upper and lower threshold levels, respectively, for this specific data rate. Columns 4 and 5 of Table 1 below provide exemplary lower and upper threshold values, respectively, for corresponding data rates. These results are presented graphically in FIG. 6.

TABLE 1

| Data Rate (Mbps) | SNR @ 5% PER (dB) | Resolution (dB) | Lower threshold SD Value | Upper Threshold SD Value |
| --- | --- | --- | --- | --- |
| 54 | 26.5 | 4.0 | 2.6 | 4.2 |
| 48 | 24.5 | 4.5 | 3.3 | 5.3 |
| 36 | 20.75 | 5.0 | 4.8 | 8.4 |
| 24 | 15.5 | 5.5 | 8.5 | 16.0 |
| 12 | 10.25 | 6.0 | 15.2 | 30.0 |
| 6 | 7.0 | 8.0 | 19.6 | — |

Figure 7:
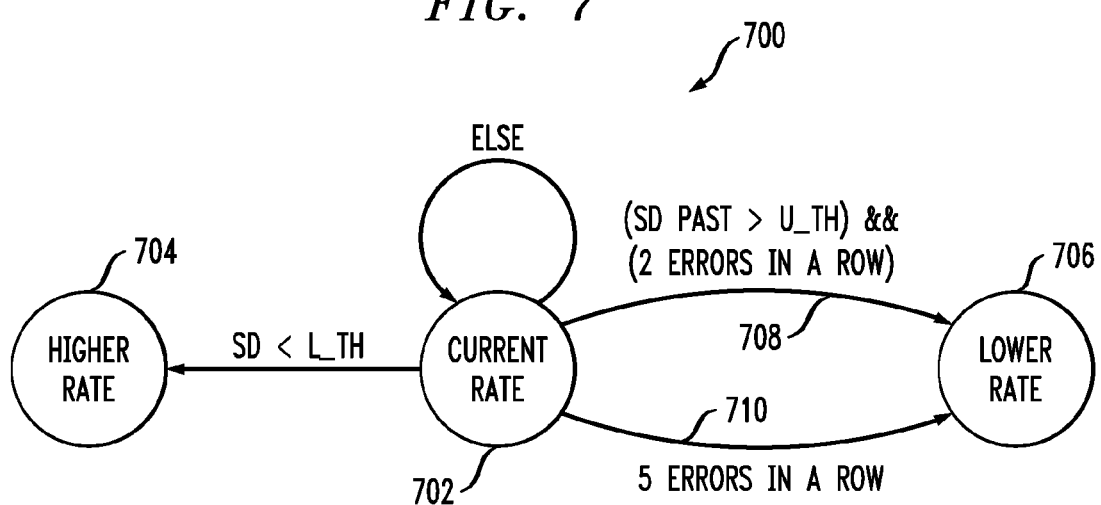
FIG. 7 is a state diagram depicting an exemplary rate switching methodology, in accordance with one aspect of the invention.

FIG. 7 is a state diagram of an illustrative rate-switching methodology 700, formed in accordance with one aspect of the present invention. The illustrative rate-switching methodology 700 employs an SD indicator which may be determined as previously described herein. As shown in the figure, the illustrative rate-switching methodology preferably includes three states, namely, a "Current Rate" state 702, a "Higher Rate" state 704, and a "Lower Rate" state 706. Additional or alternative states are contemplated by the present invention. It is assumed that the method begins in state 702. In state 702, a current data rate remains the same and a lower threshold level L_Th and upper threshold level U_Th are set to the respective threshold levels of the corresponding current data rate.

When the measured SD value, as may be provided by the SD indicator, is greater than or equal to the current lower threshold level and less than or equal to the current upper threshold level, the exemplary method 700 remains in state 702, thereby leaving the data transmission rate unchanged. When the measured SD value is below a lower threshold level corresponding to a higher data rate, a rate up-switching is performed. Thus, in accordance with an illustrative aspect of the invention, switching up a rate is performed by comparing the current SD value with the lower threshold values of one or more higher data rates. When the current SD value is below one of the lower threshold values associated with the higher data rates, the current data rate switches to the highest data rate meeting this criteria. In this manner, it is possible to advantageously increase the data rate by more than one step. In this example, the method 700 enters state 704. In state 704, the current data rate is preferably set equal to the higher data rate, and the upper threshold level is set to the respective threshold level of the corresponding higher data rate. Since the higher data rate essentially becomes the current data rate, the method may re-enter state 702 after completing the above-noted modifications.

Rate down-switching may still rely on the occurrence of errors, but also preferably bases such rate-switching decision on past measured SD information. For example, the method may enter state 706 via a primary decision path 708 when a predetermined number of consecutive errors (e.g., two) are detected and when a predetermined number of past measured SD values are above the upper threshold level corresponding to the current data rate. In state 706, the current data rate may be set to a lower data rate and the upper threshold value may be set to the respective threshold level corresponding to the lower data rate. As in the rate up-switching case, the lower data rate essentially becomes the current data rate, and thus the method 700 may re-enter state 702. In accordance with one aspect of the invention, rate down-switching, in a manner similar to the rate up-switching methodology previously described, may involve decreasing the data rate by more than one step.

The illustrative method 700 assumes that a rapid SD change does not occur. Therefore, when the predetermined number of errors is detected, which would otherwise necessitate switching to a lower data transmission rate, but past measured SD values are below the upper threshold level for the current data rate, the method may choose to keep the current data rate unchanged. In such a situation, the detected errors may be attributed to collisions rather than to degraded channel conditions.

To avoid a potential deadlock situation, wherein a relatively large number of consecutive errors are detected (thus reducing system throughput) but past measured SD values are still below the upper threshold level corresponding to the current data rate, the method may include a secondary decision path 710 from state 702 to state 706. This secondary path 710 may base the rate down-switching decision only on the number of consecutive errors detected, rather than on past measured SD values as well. For example, when a preset number of consecutive errors occur (e.g., five), the method may automatically enter state 706, thus lowering the data rate without checking past SD values. The number of consecutive errors detected for the secondary decision path 710 is preferably set to be larger than the number of errors detected for the primary decision path 708.

Simulations where the measured SD value is averaged over more than one packet can also be performed. In this instance, the lower and upper threshold levels may be closer together, which may make it easier to distinguish between the different data rates, at the expense of slower rate switching. However, when averaging over more than one packet, it is important to consider the length of time between successive packets. When the time between packets is large, channel conditions can change drastically, resulting in an SD value that does not accurately estimate the actual channel conditions.

From the above exemplary simulations, it follows that a decision can be made for rate-switching on the basis of the measured SD value. In accordance with another aspect of the invention, a less stringent definition of the SD resolution may result in relaxation of the upper and lower threshold levels. However, this may yield a less reliable rate estimation for the specific criterion of 5% PER. An alternative approach to relaxing the threshold levels may be to adopt a less stringent PER criterion, for example, a 10% PER rather than a 5% PER.

In accordance with another aspect of the invention, a circuit for controlling the data transmission rate of the transceiver may include a controller (not shown) that is configurable for performing at least a portion of the methodologies of the invention described herein. The term controller, as used herein, is intended to include any processing device, such as, for example, one that includes a central processing unit (CPU) and/or other processing circuitry (e.g., microprocessor). Additionally, it is to be understood that the term "controller" may refer to more than one controller device, and that various elements associated with a controller device may be shared by other controller devices.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims. For example, the invention can be used with standards other than IEEE 802.11 (e.g., IEEE 802.15), as well as in non-standard applications.

What is claimed is:

1. In a wireless system comprising at least one transceiver configurable for communication over a wireless communication channel, the transceiver comprising a transmitter and a receiver, a method for controlling a transmission rate of the at least one transceiver over the wireless communication channel, the method comprising the steps of:
   determining a signal quality characteristic corresponding to a signal received at the receiver by measuring a difference between one or more reference constellation points and one or more received constellation points, the signal quality characteristic representing an estimation of signal degradation through the wireless communication channel; and
   controlling a transmission rate of the transmitter over the wireless communication channel as a function of the signal quality characteristic;
   wherein the step of controlling the transmission rate over the wireless communication channel comprises:
      determining lower and upper threshold levels representing reference minimum and maximum signal quality characteristics, respectively, corresponding to the transmission rate;
      determining whether the determined signal quality characteristic is within the lower and upper threshold levels;
      maintaining the transmission rate when the determined signal quality characteristic is between the lower and upper threshold levels; and
      increasing the transmission rate to a given transmission rate when the determined signal quality characteristic is less than a lower threshold level representing a reference minimum signal quality characteristic associated with the given transmission rate.

2. The method of claim 1, wherein the step of increasing the transmission rate further comprises the step of associating new lower and upper threshold levels representing reference minimum and maximum signal quality characteristics, respectively, corresponding to the increased transmission rate.

3. The method of claim 1, wherein the reference minimum and maximum signal quality characteristics are based on a predetermined minimum desired error rate and a maximum desired error rate, respectively, of the at least one transceiver.

4. The method of claim 1, wherein the step of measuring the difference between one or more reference constellation points and one or more received constellation points comprises:
   generating error signals for each of at least a portion of data samples in the received signal, the error signals being a function of the differences between the received constellation points and the corresponding reference constellation points; and
   determining a magnitude of the error signals, the magnitude of the error signals representing the measured difference.

5. The method of claim 1, wherein the step of determining a signal quality characteristic comprises measuring a difference between one or more reference constellation points and one or more received constellation points for at least one of data samples and control samples corresponding to the received signal.

6. The method of claim 1, wherein the measured difference comprises a Euclidean distance.

7. The method of claim 1, wherein the step of controlling the transmission rate of the transmitter further comprises decreasing the transmission rate when the determined signal quality characteristic is greater than one or more upper threshold levels associated with one or more corresponding lower transmission rates.

8. The method of claim 1, wherein the step of determining the signal quality characteristic comprises:
   averaging at least a portion of measured differences over a plurality of one of data samples and control samples of the received signal, the signal quality characteristic being a function of the resulting averaged difference, wherein the step of averaging at least a portion of measured differences comprises the step of adding a difference value corresponding to a present data sample of the received signal and a difference value corresponding to a previous data sample of the received signal.

9. The method of claim 1, wherein measuring the difference between the one or more reference constellation points and the one or more received constellation points comprises aligning the one or more received constellation points with the one or more corresponding reference constellation points, the aligning step including the step of scaling the one or more received constellation points by a prescribed scaling factor.

10. A circuit for selectively adapting a transmission rate over a wireless communication channel of a wireless communication system, the wireless communication system comprising a transceiver configurable for communication over the wireless communication channel, the transceiver comprising a receiver and a transmitter, the circuit comprising:
   at least one controller, the at least one controller being operative to: (i) determine a signal quality characteristic corresponding to a signal received at the receiver by measuring a difference between one or more reference constellation points and one or more received constellation points, the signal quality characteristic representing an estimation of signal degradation through the wireless communication channel; and (ii) modify a transmission rate of the transmitter over the wireless communication channel based, at least in part, on the signal quality characteristic;
   wherein the at least one controller is further operative to: (iii) determine lower and upper threshold levels representing reference minimum and maximum signal quality characteristics, respectively, corresponding to the transmission rate; (iv) determine whether the determined signal quality characteristic is within the lower and upper threshold levels; (v) maintain the transmission rate when the determined signal quality characteristic is between the lower and upper threshold levels; and (vi) increase the transmission rate to a given transmission rate when the determined signal quality characteristic is less than a lower threshold level representing a reference minimum signal quality characteristic associated with the given transmission rate.

11. The circuit of claim 10, wherein in determining the signal quality characteristic, the at least one controller is operative to measure the difference between one or more reference constellation points and one or more received constellation points for at least one of data samples and control samples corresponding to the received signal.

12. The circuit of claim 10, wherein in measuring the difference between the one or more reference constellation points and the one or more received constellation points, the at least one controller is operative to align the one or more received constellation points with the one or more corresponding reference constellation points, the aligning operation including scaling the one or more received constellation points by a prescribed scaling factor.

13. The circuit of claim 10, wherein the at least one controller is further operative to average at least a portion of measured differences over a plurality of one of data samples and control samples of the received signal, the signal quality characteristic being a function of the resulting averaged difference.

14. The circuit of claim 10, wherein the at least one controller is further operative to: generate error signals for each of at least a portion of the data samples in the received signal, the error signals being a function of the differences between the received constellation points and the corresponding reference constellation points; and determine a magnitude of the error signals, the magnitude of the error signals representing the measured difference.

15. An integrated circuit comprising at least one circuit for selectively adapting a transmission rate over a wireless communication channel of a wireless communication system, the wireless communication system comprising a transceiver configurable for communication over the wireless communication channel, the transceiver comprising a receiver and a transmitter, the at least one circuit comprising:

at least one controller, the at least one controller being operative to: (i) determine a signal quality characteristic corresponding to a signal received at the receiver by measuring a difference between one or more reference constellation points and one or more received constellation points, the signal quality characteristic representing an estimation of signal degradation through the wireless communication channel; and (ii) modify a transmission rate of the transmitter over the wireless communication channel based, at least in part, on the signal quality characteristic;

wherein the at least one controller is further operative to: (iii) determine lower and upper threshold levels representing reference minimum and maximum signal quality characteristics, respectively, corresponding to the transmission rate; (iv) determine whether the determined signal quality characteristic is within the lower and upper threshold levels; (v) maintain the transmission rate when the determined signal quality characteristic is between the lower and upper threshold levels; and (vi) increase the transmission rate to a given transmission rate when the determined signal quality characteristic is less than a lower threshold level representing a reference minimum signal quality characteristic associated with the given transmission rate.

16. The integrated circuit of claim 15, wherein the at least one controller is further operative to average at least a portion of measured differences over a plurality of one of data samples and control samples of the received signal, the signal quality characteristic being a function of the resulting averaged difference.

17. The integrated circuit of claim 15, wherein the at least one controller is further operative to: generate error signals for each of at least a portion of the data samples in the received signal, the error signals being a function of the differences between the received constellation points and the corresponding reference constellation points; and determine a magnitude of the error signals, the magnitude of the error signals representing the measured difference.

18. The integrated circuit of claim 15, wherein in determining the signal quality characteristic, the at least one controller is operative to measure the difference between one or more reference constellation points and one or more received constellation points for at least one of data samples and control samples corresponding to the received signal.

19. The integrated circuit of claim 15, wherein in measuring the difference between the one or more reference constellation points and the one or more received constellation points, the at least one controller is operative to align the one or more received constellation points with the one or more corresponding reference constellation points, the aligning operation including scaling the one or more received constellation points by a prescribed scaling factor.

* * * * *